(12) United States Patent
Yarkosky

(10) Patent No.: US 7,567,529 B1
(45) Date of Patent: *Jul. 28, 2009

(54) METHOD AND SYSTEM FOR SELECTING VOCODER DATA RATES AND TRANSMIT POWERS FOR AIR INTERFACE COMMUNICATIONS

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/832,832

(22) Filed: Aug. 2, 2007

Related U.S. Application Data

(63) Continuation of application No. 10/068,422, filed on Feb. 6, 2002, now Pat. No. 7,272,118.

(51) Int. Cl.
H04W 4/00 (2006.01)
(52) U.S. Cl. .................. 370/328; 370/342; 370/311
(58) Field of Classification Search .......... 370/310–350
See application file for complete search history.

(56) References Cited

U.S. PATENT DOCUMENTS

| | | | |
|---|---|---|---|
| 5,574,979 A | 11/1996 | West | |
| 5,862,190 A | 1/1999 | Schaffner | |
| 6,014,375 A | 1/2000 | Janky | |
| 6,034,971 A | 3/2000 | Love et al. | |
| 6,097,972 A | 8/2000 | Saints et al. | |
| 6,100,806 A | 8/2000 | Gaukel | |
| 6,697,343 B1 | 2/2004 | Kamel et al. | |
| 6,704,368 B1 | 3/2004 | Nefedov | |
| 6,859,652 B2 | 2/2005 | Karabinis et al. | |
| 6,987,729 B1* | 1/2006 | Gopalakrishnan et al. | ... 370/230 |
| 7,130,311 B2* | 10/2006 | Yavuz et al. | ................. 370/468 |
| 7,142,867 B1* | 11/2006 | Gandhi et al. | ............... 455/453 |
| 7,146,174 B2* | 12/2006 | Gardner et al. | .............. 455/453 |
| 7,245,600 B2* | 7/2007 | Chen | .......................... 370/335 |
| 2001/0040880 A1* | 11/2001 | Chen et al. | ................... 370/337 |
| 2002/0111183 A1 | 8/2002 | Lundby | |
| 2002/0163879 A1 | 11/2002 | Li et al. | |
| 2003/0086397 A1* | 5/2003 | Chen | .......................... 370/335 |
| 2006/0019610 A1* | 1/2006 | Ue et al. | ........................ 455/69 |
| 2007/0165562 A1* | 7/2007 | Bourlas et al. | .............. 370/328 |

OTHER PUBLICATIONS

K. Choi, et al., "Adaptive Data Rate Transmission in CDMA Networks Over Time Varying Traffic Channel", www.aranet.co.kr/sem_pdf/cdma/EEE/E4-2.pdf (visited Mar. 20, 2001), 4 pages.

W. Marshall, et al, "Integration of Resource Management and Call Signaling for IP Telephony" www.softarmor.com/sipwg/drafts/morgue/draft-dcsgroup-sip-resource-00.txt (visited Apr. 9, 2002), 11 pages.

(Continued)

*Primary Examiner*—Hong Cho
*Assistant Examiner*—Michael J Moore, Jr.

(57) ABSTRACT

A method and system for managing communications over an air interface of a wireless network. A base station may measure a level of interference over the air interface. Based on the level of interference, the base station may adjust a data rate and a transmit power of signals transmitted over the air interface.

17 Claims, 3 Drawing Sheets

OTHER PUBLICATIONS

Thomas Frieling, "Re: Available Bit Rate Service" www.cell-relay.indiana.edu/mhonarc/cell-relay/1999-Jun/msg00050.html (visited Mar. 20, 2001), 2 pages.

Introduction to cdma2000 Standards for Spread Spectrum Systems, Mar. 2000, TIA Ballot Resolution Version, TIA/EIA/IS2000 Part 2-A-1; Table of Contents, pp. i-xlvi; Section 2.1.2 (Power Output Characteristics), pp. 2-37 to 2-60; Section 2.1.3 (Modulation Characteristics) pp. 2-61 to 2-202 (231 total pages).

Introduction to cdma2000 Standards for Spread Spectrum Systems, Mar. 2000, TIA Ballot Resolution Version, TIA/EIA/IS2000 Part 5-A-1; Table of Contents, pp. i-xliv; Section 2.6.4 (Mobile Station Control on the Traffic Channel State), pp. 2-243 to 2-327; Section 3.6.4 (Traffic Channel Processing), pp. 3-24 to 3-61; Section 3.7.3 (f-dsch), pp. 3-338 to 3-584 (367 total pages).

* cited by examiner

METHOD AND SYSTEM FOR SELECTING VOCODER DATA RATES AND TRANSMIT POWERS FOR AIR INTERFACE COMMUNICATIONS

CROSS-REFERENCE TO RELATED APPLICATIONS

This is a continuation of application Ser. No. 10/068,422, filed Feb. 6, 2002, which application is incorporated herein by reference.

BACKGROUND

1. Field of Invention

This invention relates to mobile communications and more particularly to a method and system for selecting vocoder rates and transmit powers for communications over an air interface of a wireless network.

2. Description of Related Art

Wireless networks are an increasingly popular means of communications. People are using mobile stations such as cellular telephones so that they can readily stay in touch with others.

The wireless network typically includes a base station. The base station produces a radiation pattern defining a cell and/or sector in which the mobile stations operate. The radiation pattern allows for the base station to transmit and receive signals over an air interface of the wireless network. The base station may exchange the signals with a mobile switching center within the wireless network. The mobile switching center sets up and connects calls so that the mobile stations can communicate with a remote device.

A vocoder (voice coder) on the base station and on each of the mobile stations may generate the signals that are exchanged over the air interface. The vocoder encodes speech at a data rate into the signals that are transmitted and received over the air interface. Typically, if the vocoder encodes the speech at a higher data rate, the signals better represent the speech. Thus, the vocoder may select a data rate of 9600 bits per second (bps), so as to produce signals that accurately represent the speech. Conversely, the vocoder may select a data rate of 2400 bps so as to produce signals that marginally represent the speech.

The number of calls that the air interface can handle (i.e., call capacity) is determined by the data rate at which the vocoders encode the speech. For example, a wireless network having vocoders encoding at a high data rate, e.g., 9600 bps, would have a smaller call capacity than a wireless network having vocoders encoding at a low data rate, e.g., 4800 bps.

Simultaneous mode vocoders (SMVs) have been developed to increase the call capacity of the wireless network. The SMVs account for a type of speech when encoding speech. For example, when conversation is occurring, the SMVs encode speech at a full data rate of 9600 bps. When there is silence, the SMVs transmit at $\frac{1}{8}^{th}$ the full data rate (1200 bps). As normal voice conversations occur in bursts of time, the average data rate of the SMVs is lower than that of traditional vocoders. Thus, the SMVs permit a higher speech quality at a lower average data rate. In turn, the lower average data rate increases the call capacity of the wireless network.

Speech encoding is not the only factor that determines the call capacity of the wireless network. The transmit power of the signals transmitted over the air interface may also influence the call capacity. For example, the call capacity of the wireless network may decrease as the transmit power of the signals exchanged over the air interface increases. Conversely, the call capacity of the wireless network may increase as the transmit power of the signals decreases.

The transmit power over the air interface is typically set in accordance with a frame error rate (FER). A frame defines a fixed number of bits that are transmitted over the air interface. The FER is a ratio of (i) a number of frames that has been received over the air interface that have at least one bit in error to (ii) a total number of frames that has been received over the air interface. The transmit power can be adjusted to increase or decrease the FER over the air interface. The adjustment of the transmit power may also result in an increase or decrease in the call capacity of the wireless network.

SUMMARY

The present invention stems from a realization of the difficulty in managing communications in wireless networks. Both the data rate and the transmit power of the signals exchanged over the air interface influence the call capacity of the wireless networks. Therefore, it would be advantageous to have an efficient method and system for selecting the data rate and the transmit power for base stations and mobile stations in the wireless networks.

In accordance with a principle aspect of the present invention, the data rate and/or the transmit power of signals exchanged over the air interface may be adjusted based on a level of interference over the air interface. The level of interference may be characterized by an aggregate energy-to-interference and/or an energy-to-interference.

The aggregate energy-to-interference may be representative of the interference between a base station on the wireless network and a plurality of mobile terminals served by the base station. Based on the aggregate energy-to-interference of the wireless network, the base station may reduce the data rate of signals exchanged between the base station and the plurality of mobile stations served by the base station. The base station may reduce the data rate, for example, if the aggregate energy-to-interference is greater than a threshold set by an operator of the wireless network. The reduction in data rate may increase the call capacity of the wireless network.

The energy-to-interference may be representative of interference over the air interface as between the base station and a single mobile station served by the base station. Based on the energy-to-interference of the wireless network, the base station may reduce the data rate of signals exchanged between the base station and a single mobile station served by the base station. The base station may reduce the data rate, for example, if the energy-to-interference is greater than a threshold also set by the operator of the wireless network. Again, the reduction in data rate may increase the call capacity of the wireless network.

If both the aggregate energy-to-interference and the energy-to-interference are less than their respective thresholds, then the base station will not adjust the data rate of the signals. Instead, the base station may increase the transmit power of the signals that are exchanged over the air interface. The transmit power may be increased for the signals that are exchanged between the base station and a single mobile station served by the base station. The increase in the transmit power may result in a reduction of the FER over the air interface.

Thus, in one respect, an exemplary embodiment of the present invention may take the form of a method and system for managing communications in a wireless network. A first entity such as a base station and at least one second entity such as a mobile station may be separated by an air interface. Based on a measure of interference over the air interface, i.e., aggregate energy-to-interference and/or energy-to-interference, the base station may select a data rate for the signals transmitted over the air interface. The data rate may be selected for the signals transmitted from the base station to at least one mobile station served by the base station. Additionally, a separate data rate may be selected for the signals transmitted from the at least one mobile station served by the base station to the base station. The base station and the at least one mobile station may then exchange signals at the data rates.

In another respect, the method and system may also involve selecting a transmit power. Based on the measure of aggregate energy-to-interference and energy-to-interference, the base station may select a transmit power for the signals transmitted from the base station to a single mobile station served by the base station. Additionally, the base station may select a separate transmit power for the signals transmitted from the single mobile station to the base station. The base station and the single mobile station may then exchange signals at the transmit powers.

These as well as other aspects and advantages of the exemplary embodiments will become apparent to those of ordinary skill in the art by reading the following detailed description with appropriate reference to the accompanying drawings.

BRIEF DESCRIPTION OF THE FIGURES

An exemplary embodiment of the present invention is described herein with reference to the drawings, in which.

DETAILED DESCRIPTION OF EXEMPLARY EMBODIMENTS

A. Architecture for Exemplary Wireless Network

Figure 1:
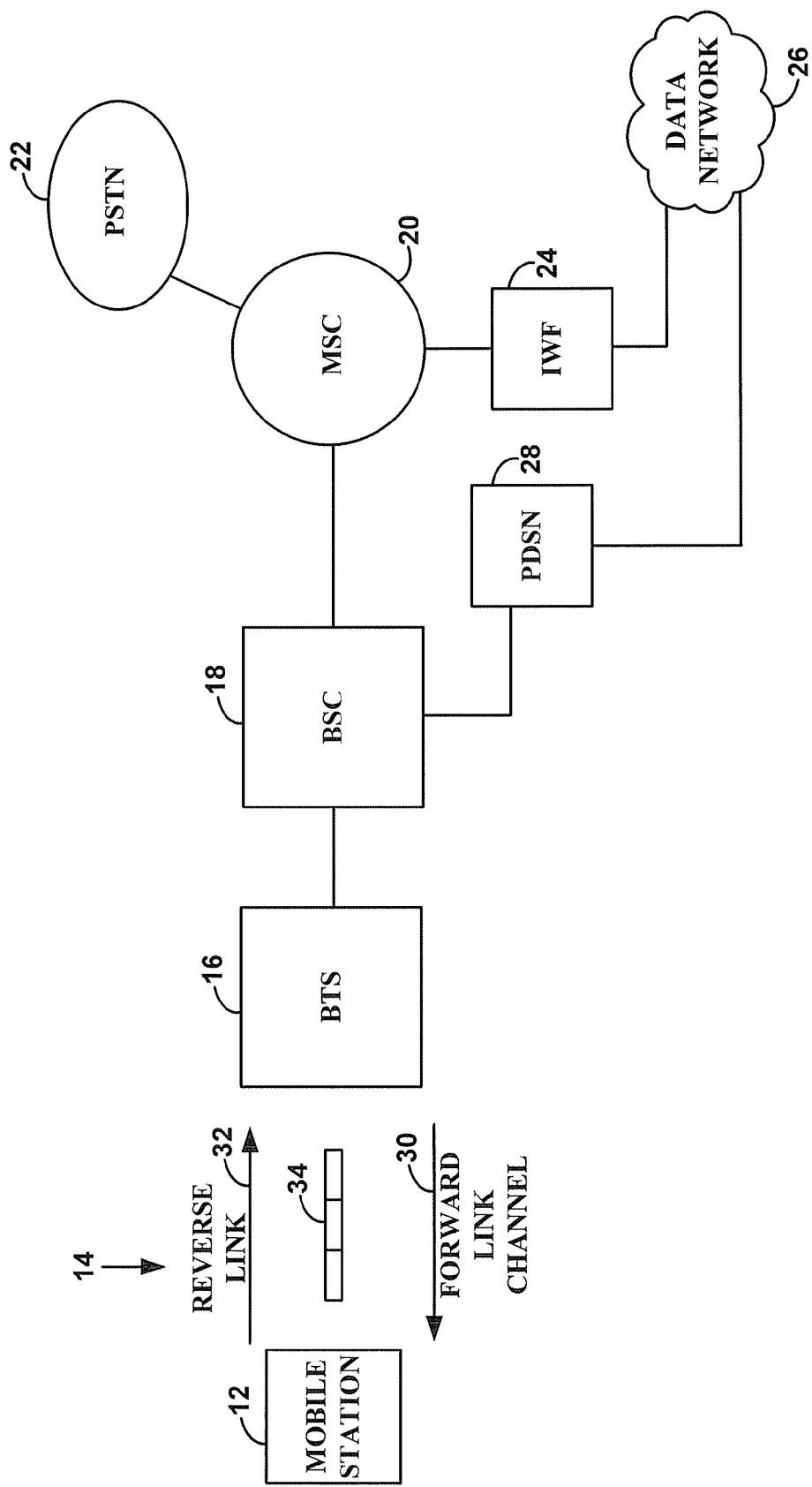
FIG. 1 is a block diagram of a wireless network.

Referring to the drawings, FIG. 1 is a block diagram of a wireless network in which exemplary embodiments of the present invention may be employed. Those skilled in the art will appreciate that many of the elements described herein are functional entities that may be implemented as discrete components or in conjunction with other components, in any suitable combination or location. Still further, various functions described herein as being performed by one or more entities may be carried out by a processor programmed to execute an appropriate set of computer instructions stored in memory. Provided with the present disclosure, those skilled in the art can readily prepare an appropriate set of computer instructions (e.g., software) to perform such functions.

Referring to FIG. 1, the wireless network is shown to include a mobile station 12, which communicates via an air interface 14 with a base transceiver station (BTS) 16. The BTS 16 may include an antenna that produces a radiation pattern defining a cell and/or sector in which mobile stations operate. The BTS 16 may, in turn, communicate with a base station controller (BSC) 18. The BSC 18 controls traffic via a plurality of BTSs. The BSC 18 also communicates with a mobile switching center (MSC) 20. The MSC 20 may serve to set up and connect calls with other switches. The MSC 20 may thus be coupled with (or sit as a node on) a public switched telephone network (PSTN) 22.

The MSC 20 may also be coupled to an interworking function (IWF) 24. The IWF 24 may transmit and receive data between the MSC 20 and a data network 26 such as the Internet. In addition to or instead of the IWF 24, the BSC 18 may also be coupled to a packet data serving node (PDSN) 28. The PDSN 28 may also transmit and receive data between the mobile station 12 and the data network 26.

When the mobile station 12 is positioned in a cell, the mobile station 12 and the BTS 16 and BSC 18 (collectively referred to herein as a base station) may exchange signals over the air interface 14. The air interface 14 may have a forward link channel 30 and a reverse link channel 32.

The forward link channel 30 may carry the signals in a "forward" direction from the base station to the mobile station 12 over the air interface 14. The signals transmitted over the forward link channel 30 may be formatted as bits in frames 34, preferably 20 ms in duration, but of course other arrangements are also possible.

Conversely, the reverse link channel 32 may carry the signals in a "reverse" direction from the mobile station 12 to the base station over the air interface 14. The signals transmitted over the reverse link channel 32 may also be formatted as bits in frames 34.

The reverse link channel 30 may be subdivided into a number of channels. The reverse link channel, for example, may include a reverse link pilot channel. The reverse link pilot channel carries signaling and control information from the mobile stations served by the base station to the base station.

The mobile station 12 may transmit signals over the air interface 14 at a data rate and a transmit power. The data rate may be the rate at which a vocoder on the mobile station 12 encodes speech and transmits the signals over the air interface 14. The transmit power may be the power at which the mobile station 12 transmits the signals over the air interface 14.

Likewise, the base station may transmit signals over the air interface at a date rate and a transmit power. The data rate and the transmit power need not be the same as that used by the mobile station 12. The data rate may be the rate at which a vocoder on the base station encodes speech and transmits the signals over the air interface 14. The transmit power may be the power at which the base station transmits the signals over the air interface 14.

B. Network-Based Data Rate Control and Power Control

Figure 2:
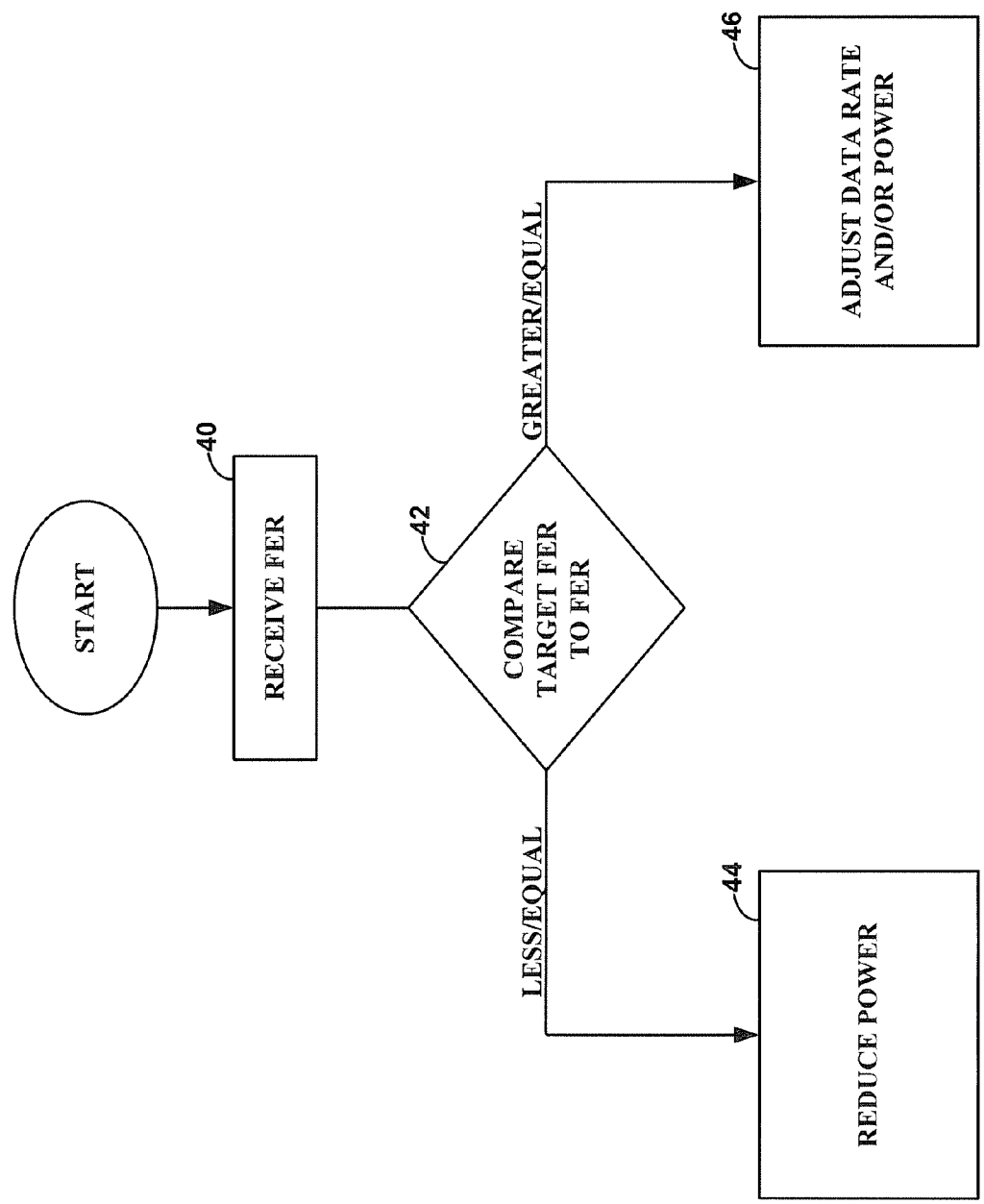
FIG. 2 illustrates an exemplary network-based process for adjusting transmit power and data rate of signals.

FIG. 2 illustrates an exemplary network-based process for adjusting the transmit power and the data rate of the signals transmitted between the mobile station 12 and the base station. The base station, for example, may be programmed to carry out the network-based process so as to manage communications over the wireless network.

The network-based process of FIG. 2 is set forth as various logical paths for determining whether to increase or decrease the data rate and/or the transmit power of the signals transmitted over the air interface 14. The exemplary embodiments of the present invention assume that the base station and the mobile terminal 12 adjust the data rate and/or transmit power of the signals transmitted over the air interface 14. The base station and the mobile terminal 12, however, need not both adjust the data rate and/or transmit power. For example, the base station may adjust the data rate and/or transmit power of the signals transmitted over the air interface 14, but the mobile station 12 need not. Likewise, the mobile station 12 may adjust the data rate and/or transmit power of the signals transmitted over the air interface 14, but the base station need not.

Moreover, the exemplary embodiments of the present invention are not limited by the data rate and the transmit power of the signals transmitted by the mobile terminal 12 being the same as the data rate and the transmit power of the signals transmitted by the base station. The data rate and power of the signals transmitted by the mobile terminal 12 can be set independently from that of the base station.

Referring to FIG. 2, the base station may receive an indication of a frame error rate (FER) over the air interface 14 at block 40. The base station may receive the indication of the FER in a message, for example, sent by a mobile terminal 12 over the reverse link pilot channel of the reverse link 32. The FER may characterize a reliability of the wireless network to transport bits over the air interface 14.

The FER may be a ratio of (i) a number of frames having at least one bit in error to (ii) a total number of frames transmitted over the forward link channel 30 of the air interface. Of course, other arrangements are possible for calculating the FER over the air interface. The FER over the air interface may be determined by other types of measures that also characterize the reliability of the air interface.

At block 42, the base station may determine whether to adjust transmit power and/or data rate of the signals exchanged over the air interface. The base station may compare the FER of the air interface 14 to a target FER. The target FER may be an FER over the air interface 14 set by an operator of the wireless network. If the FER of the air interface 14 is less than (or equal to) the target FER, then at block 44 the base station may reduce the transmit power of the signals transmitted over the air interface 14. Reducing the transmit power may increase the call capacity of the wireless network.

Alternatively, if the FER of the air interface 14 is greater than (or equal to) the target FER, then, at block 46, the base station may adjust the data rate and/or transmit power of the signals transmitted over the air interface 14. The adjustment of the data rate and/or transmit power may result in an increase in the call capacity of the wireless network and/or the FER over the air interface 14 being reduced.

The data rate and/or the transmit power may be adjusted according to a level of interference over the air interface 14. The level of interference is an indication of how much stronger the signals that are received by the base station or mobile station are to background noise. The level of interference may be measured as a signal-to-noise ratio of the air interface 14, but of course other arrangements are also possible.

According to an exemplary embodiment of the present invention, the base station may use the reverse link pilot channel to measure the level of interference over the air interface 14. The level of interference over the air interface 14 may be measured by an aggregate reverse-$E_c/I_o$ (i.e., aggregate R-$E_c/I_o$). Additionally or alternatively, the level of interference over the air interface 14 may be measured by a reverse-$E_c/I_o$ (i.e., R-$E_c/I_o$).

The aggregate R-$E_c/I_o$ may be a ratio of (i) energy received from more than one mobile station to (ii) the total amount of interference (e.g., signal and noise) received by the base station. The R-$E_c/I_o$ may be a ratio of (i) energy received from a single mobile station to (ii) the total interference received by the base station. The base station may use the measure of aggregate R-$E_c/I_o$ and/or R-$E_c/I_o$ to adjust the data rate and/or transmit power of the signals transmitted over the air interface 14 between the base station and the mobile stations served by the base station.

Figure 3:
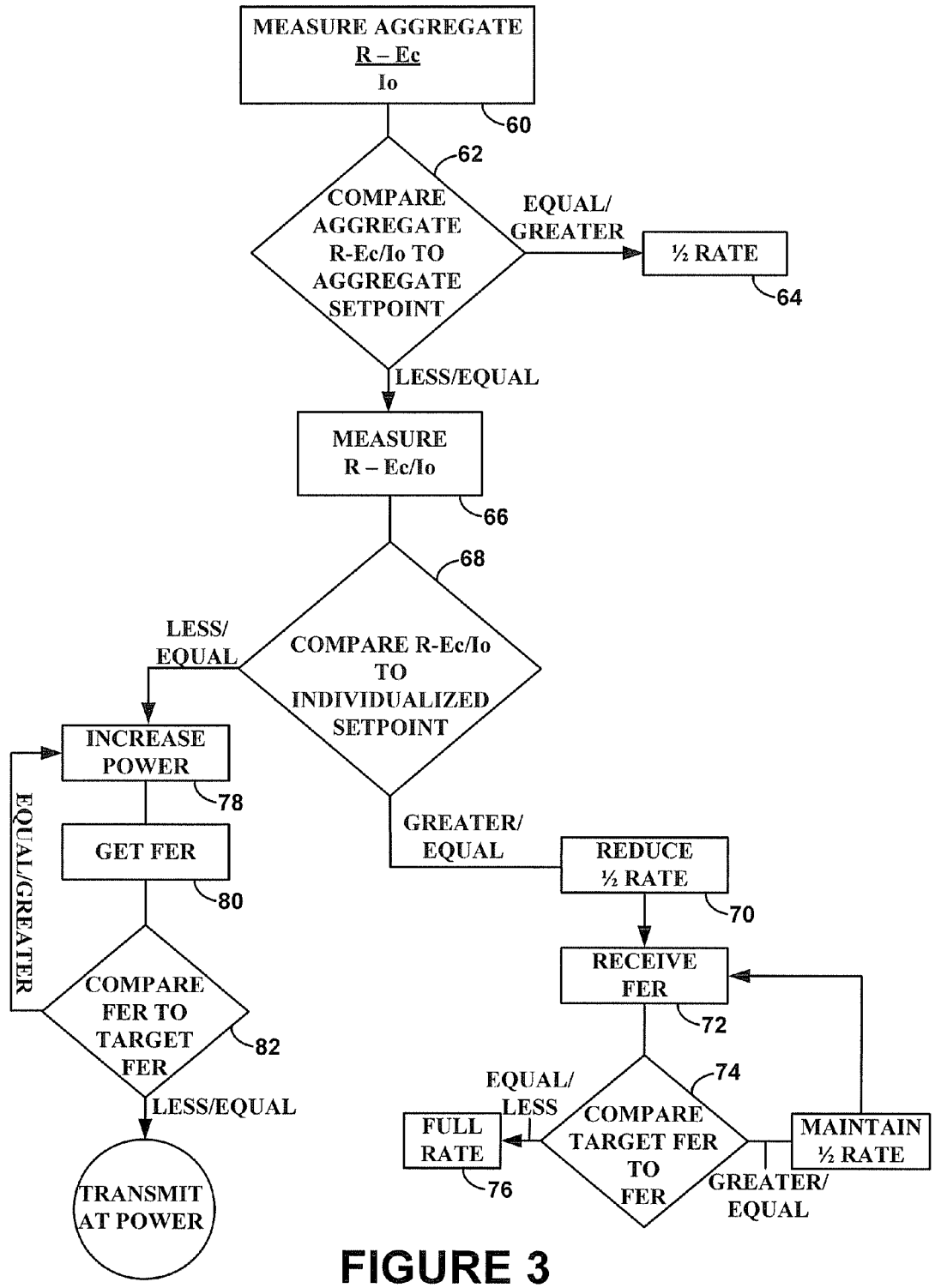
FIG. 3 is a flow chart that illustrates in more detail how to adjust the data rate and/or transmit power of the signals.

FIG. 3 is a flow chart, which illustrates in more detail the adjustment of the data rate and/or the transmit power identified by block 46 of FIG. 2. At block 60, the base station may measure the aggregate R-$E_c/I_o$ over the air interface 14. The aggregate R-$E_c/I_o$ may be measured in four steps. Of course, the steps may be combined, divided, or arranged differently from what is described herein.

The first step may be for the base station to measure the reverse link pilot energy per chip, R-$E_c$, on the reverse link pilot channel. The reverse link pilot energy per chip may be the energy of a fixed number of bits received from a mobile station over the reverse link pilot channel. The fixed number of bits may be, for example, the bits in a one or more frames 34. The base station may identify that a frame is from a mobile station by an address. The address, such as a mobile identification number (MIN), may be appended to the frame to indicate a source (i.e., mobile station) of the frame. Other arrangements are also possible.

The second step may be for the base station to aggregate the R-$E_c$ measured for each mobile station that the base station serves. An aggregate R-$E_c$ may be a measure of the total energy received over the reverse link pilot channel for all the mobile stations served by the base station.

The third step may be for the base station to measure the total received power spectral density on the reverse link pilot channel. The total received power spectral density $I_o$ may be a sum of power corresponding to (i) a noise floor level of the air interface (which includes background noise) and (ii) the signals received by the base station from the mobile stations that the base station serves.

The fourth step may be for the base station to compute the ratio of (i) the aggregate R-$E_c$ to (ii) the total received power spectral density $I_o$. The ratio may be a measure of the level interference over the air interface 14 (i.e., an aggregate R-$E_c/I_o$) between the base station and the mobile stations that the base station serves.

At block 62, the base station may compare the aggregate R-$E_c/I_o$ to an aggregate set point. The aggregate set point may be a threshold beyond which the data rate of the signals transmitted over the air interface may be adjusted. The aggregate set point may be set by an operator of the wireless network. In a preferred embodiment, the aggregate set point may be based on a ratio of total available power to currently used power by a base station, e.g., −8 dBm.

At least one vocoder on the base station and at least one vocoder on each of the mobile stations may encode speech into signals and transmit the signals over the air interface 14. If the aggregate R-$E_c/I_o$ is greater than (or equal to) the aggregate set point, then, at block 64, the base station may instruct its vocoder to reduce the data rate of the signals transmitted over the air interface 14. The vocoder may reduce the data rate of the signals transmitted from the base station to the mobile stations from, for example, a full data rate (e.g., 9600 bps) to a ½ rate (e.g., 4800 bps).

Additionally, the base station may instruct the vocoder on each mobile station served by the base station to reduce the data rate of the signals transmitted over the air interface 14 from the mobile station to the base station. The base station may reduce the data rate, for example, from the full data rate to the ½ rate. The base station may send an instruction, for example, over a control channel of the forward link channel 30 to instruct the mobile stations 12 to reduce the data rate.

Each mobile station and the base station may operate its vocoder at the preferred ½ rate until the aggregate R-$E_c/I_o$ is less than the aggregate set point. Alternatively, a mobile station may resume the full data rate (e.g., 9600 bps) when the base station hands the mobile station off into a less loaded area served by another base station.

If the aggregate R-$E_c/I_o$ is less than (or equal to) the aggregate set point, then the base station will not adjust the data rate of all of the signals transmitted over the air interface 14.

Instead, the base station may adjust the data rate of the signals transmitted over the air interface 14 between a single mobile station and the base station.

At block 66, the base station may measure the level of interference over the air interface, $R-E_c/I_o$ over the air interface 14. The level of interference $R-E_c/I_o$ requires determining a reverse link pilot energy per chip, $R-E_c$ and a total received power spectral density $I_o$. The reverse link pilot energy per chip, $R-E_c$, may be the energy of a fixed number of bits received from the reverse link pilot channel for the single mobile station. The total received power spectral density $I_o$ may be a sum of power corresponding to (i) a noise floor level of the air interface; and (ii) the signals received from the base station.

Using the received pilot energy per chip and the total received power spectral density, the base station may then compute the ratio of (i) the received pilot energy per chip to (ii) the total received power spectral density. The $R-E_c/I_o$ represents a level of interference between the base station and the single mobile station.

At block 68, the base station may compare the $R-E_c/I_o$ to an individualized set point. The individualized set point may be a threshold beyond which the data rate of the signals transmitted over the air interface 14 may be adjusted. The individualized set point may be configurable by an operator of the wireless network. In a preferred embodiment, the individualized set point may be −8 dBm.

If the $R-E_c/I_o$ is greater than (or equal to) the individualized set point, then the base station may reduce the data rate of the signals transmitted over the air interface at block 70. The base station may instruct its vocoder to transmit the signals to the single mobile station at a reduced data rate, preferably ½ full rate. The base station may also instruct the vocoder of the single mobile station to transmit the signals to the base station at the reduced data rate.

The base station and/or single mobile station may transmit at the reduced data rate until the FER of the air interface 14 is below the target FER. At block 72, the base station may receive an FER over the reverse link pilot channel from the single mobile station. The base station may then compare, at block 74, the FER of the air interface 14 to a target FER. If the FER over the air interface 14 is less than (or equal to) the target FER, then the base station, at block 76, may instruct its vocoder and that of the single mobile station to resume a full data rate (e.g., 9600 bps). If the FER over the air interface 14 is greater than (or equal to) the target FER, then the base station may continue to transmit the signals over the air interface 14 at the reduced data rate.

If the $R-E_c/I_o$ is less than (or equal to) the individualized set point, then, at block 78, the base station may increase the transmit power of the signals transmitted over the air interface 14. At block 80, the base station may receive another FER from the single mobile station. At block 82, the base station may compare the FER over the air interface with a target FER. If the FER over the air interface 14 is greater than (or equal to) the target FER, then the base station may increase the transmit power of the signals. The transmit power of the signals may be increased in preferably −8 dBm steps for every one or more frames 34. When the FER over the air interface 14 is less than or equal to the target FER, the base station will stop increasing the transmit power of the signals.

Although the foregoing describes the base station adjusting the data rate of the vocoder between a full rate and a ½ rate, the base station may adjust the data rate of the vocoder to other rates. For example, the base station and/or mobile station may reduce the data rate of its vocoder to ¼$^{th}$ the full rate, ⅛$^{th}$ the full rate, or any other fraction. Also, as noted above, the base station and mobile station need not both adjust its data rate nor adjust its data rate by the same amount.

Moreover, the exemplary embodiments are not limited by adjusting the data rate of the vocoders on the base station and/or the mobile terminal 12. The data rate may be adjusted generally for any entity on the base station and/or the mobile terminal that allows for control of the data rate of the signals that are transmitted over the air interface. The entity may be the vocoder, but it is not necessarily limited to the vocoder.

Exemplary embodiments of the present invention have thus been illustrated and described. It will be understood, however, that changes and modifications may be made to the invention as described without deviating from the spirit and scope of the invention, as defined by the following claims.

I claim:

1. A method for managing communications in a wireless network, the method comprising:

calculating an aggregate energy-to-interference ratio by aggregating reverse link energy per chip measurements for each mobile station served by a base station;

comparing the aggregate energy-to-interference ratio to at least one set point;

based, at least in part, on the comparison, selecting a data rate for signals transmitted from the base station to at least one mobile station; and causing the signals from the base station to the at least one mobile station to be transmitted at the data rate.

2. The method of claim 1, further comprising:

calculating an individual energy-to-interference ratio for one of the at least one mobile station;

based on the at least one individual energy-to-interference ratio, selecting a transmit power for signals transmitted from the base station to the one of the at least one mobile station; and causing the signals from the base station to the one of the at least one mobile station to be transmitted at the transmit power.

3. The method of claim 2, further comprising causing separate signals from the one of the at least one mobile station to the base station to be transmitted at a separate transmit power.

4. The method of claim 1, further comprising causing separate signals from the at least one mobile station to the base station to be transmitted at a separate data rate.

5. The method of claim 1, wherein the base station has at least one vocoder.

6. The method of claim 1, wherein the at least one mobile station has at least one vocoder.

7. A base station comprising:

a processor;

memory; and computer instructions stored in the memory and executable by the processor for performing the functions of:

(i) calculating an aggregate energy-to-interference ratio by aggregating reverse link energy per chip measurements for each mobile station served by the base station;

(ii) comparing the aggregate energy-to-interference ratio to at least one set point;

(iii) based, at least in part, on the comparison, selecting a data rate for signals transmitted from the base station to at least one mobile station; and (iv) causing the signals from the base station to the at least one mobile station to be transmitted at the data rate.

8. The base station of claim 7, wherein the data rate is selected from the group consisting of approximately a full data rate and approximately a ½ rate.

9. The base station of claim 7, wherein the computer instructions further perform the functions of:
   calculating an individual energy-to-interference ratio for one of the at least one mobile station;
   based on the individual energy-to-interference ratio selecting a transmit power for signals transmitted from the base station to the one of the at least one mobile station; and
   causing the signals from the base station to the one of the at least one mobile station to be transmitted at the transmit power.

10. The base station of claim 9, wherein the computer instructions further perform the function of causing separate signals from the one of the at least one mobile station to the base station to be transmitted at a separate transmit power.

11. The base station of claim 7, wherein the computer instructions further perform the function of causing separate signals from the at least one mobile station to the base station to be transmitted at a separate data rate.

12. The base station of claim 7, wherein the base station further comprises a vocoder.

13. The base station of claim 7, wherein the at least one mobile station comprises a vocoder.

14. The method of claim 1, wherein the at least one set point is set by an operator of the wireless network.

15. The method of claim 1, wherein each reverse link energy per chip measurement represents an energy of a fixed number of bits received from a mobile station.

16. The base station of claim 7, wherein the at least one set point is set by an operator of the wireless network.

17. The base station of claim 7, wherein each reverse link energy per chip measurement represents an energy of a fixed number of bits received from a mobile station.

* * * * *